Figure 1:
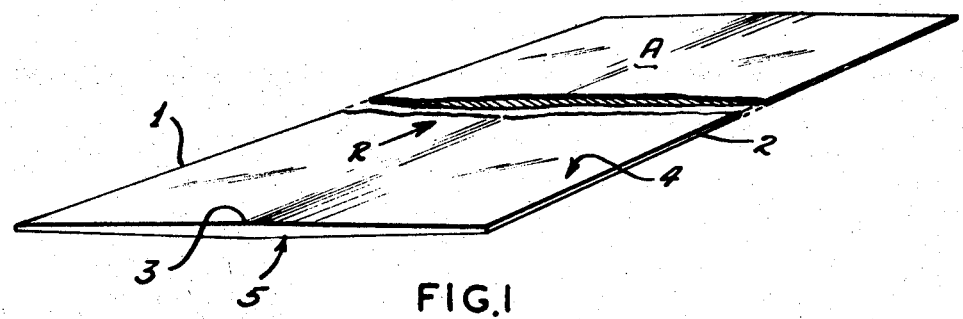

June 4, 1968

C. G. WOELFER ET AL 3,386,162

METHOD OF MAKING A MULTI-LAYERED VESSEL

Filed Feb. 28, 1966

2 Sheets-Sheet 1

INVENTORS:
CHARLES G. WOELFER
ALBERT D. DOHR
BY Gravely, Lieder & Woodruff
ATTORNEYS.

INVENTORS:
CHARLES G. WOELFER
ALBERT D. DOHR
BY Gravely, Lieder & Woodruff
ATTORNEYS.

3,386,162
METHOD OF MAKING A MULTI-LAYERED VESSEL
Charles G. Woelfer, St. Louis County, and Albert D. Dohr, St. Louis, Mo., assignors to Nooter Corporation, St. Louis, Mo., a corporation of Missouri
Filed Feb. 28, 1966, Ser. No. 530,704
8 Claims. (Cl. 29—471.1)

This invention relates to an improved multilayer vessel in which a plurality of segments are rolled or wrapped over a liner to build up a thick wall of individual layers or segments, and in particular, to a method of making a multi-layer vessel having at least one truncated segment therein applied as one of the first segments so that the vessel may be wrapped in a spiral manner thereafter.

Multi-layer vessels are old in the art. They may be made from layers which are either in the form of concentric circles or in a so-called spiral form. Concentric circle multi-layer vessels are difficult to make because so-called flat sheets from the steel mill have a slight crown thereon, as recognized in the Kepler Patent No. 2,209,402, granted July 30, 1940, due to the rolling operation in the steel mill causing their middle thickness to be slightly greater than their edge thickness. Further, the usual metal sheets used for this purpose vary in exact thickness, tend to camber, may have deviations or pockets or wrinkles therein, and tend to spring back after being rolled. Thus each concentric circular layer, which extends 360° around the preceding layer, must be measured and then cut after it has been rolled in the shop and before it is slipped on to the preceding layer of smaller diameter. Sheets of this size are difficult to cut accurately, but the measuring and cutting is important since the gap between the adjacent edges of the circular layer must be of a certain size for receiving the most desirable weld. This method of making multi-layer vessels is difficult and has the foregoing disadvantages.

Another method of making multi-layer vessels is shown in the Carstens Patent No. 3,092,148, granted June 4, 1963, which shows a liner or core having a wedge blank secured thereto over a 90° distance with a reinforcing sheet of very long length welded adjacent to the thick edge of the tapered wedge blank so that the reinforcing sheet may be spirally wound around the outer surface of the core, up over the sloping surface of the wedge blank, and then continuously wound in a spiral manner until the desired wall thickness is obtained. The difficulty with this method of making multi-layer vessels is that it is difficult to manufacture a wedge blank having a feather edge (i.e., an edge of no thickness), but more importantly, the reinforcing sheet must necessarily be rolled at the steel mill into a long strip. This long strip is then rolled up, but necessarily, the crown of each layer is positioned on the crown of the preceding layer and the thin edges of the long strip tend to have air spaces therebetween. Thus, irregularities inherent in the manufacture of the rolled layer material cumulate rather than compensate for each other.

One of the principal objects of the present invention is to provide an improved method of making a multi-layer vessel from an liner and a plurality of segments, one of the first applied segments having an increasing thickness which gradually doubles in thickness from its initial edge to its final edge. Another object is to provide a method for making multi-layer vessels in which individual segments need not be first measured for size and cut accurately before being applied to the liner or preceding segment. Another object is to apply segments to such vessels in a manner so that the direction of roll of the segment or the crown thereof is parallel to the longitudinal axis of the vessel. Another object is to provide a method for making multi-layer vessels in which sheets of uniform thickness may be applied one after the other without requiring the individual sheets to be first measured so accurately that the edges thereof are of a constant distance apart for receiving a longitudinal weld.

Another object is to provide a method which uses two segments, one of increasing thickness and the other of decreasing thickness, so that the vessel may be spirally wound but will not have a longitudinal outer ledge and will be of substantially constant wall thickness along any radial line. Another object is to provide a new vessel construction made by the foregoing method.

These and other objects and advantages will become apparent hereinafter.

The invention is embodied in a method of making a multi-layer vessel from relatively flat sheets, said method including applying a truncated sheet near the liner of the vessel so that the remaining flat sheets can thereafter be applied in spiral fashion until the vessel has reached the desired wall thickness. Thereafter, another truncated segment may be applied, if desired, to avoid a step or longitudinal seam on the outer wall and to make the walls of substantially uniform thickness along any radial line.

The invention further consists in the method hereinafter described and claimed and in the multi-layer vessel made by said method.

In the accompanying drawings which form part of this specification and wherein like numerals and symbols refer to like parts wherever they occur:

FIG. 1 is a perspective view of a sheet or segment of layer material showing the direction of roll of said material and the crown in the center of the sheet which is thicker than the thinner outer edges.

Figure 2:
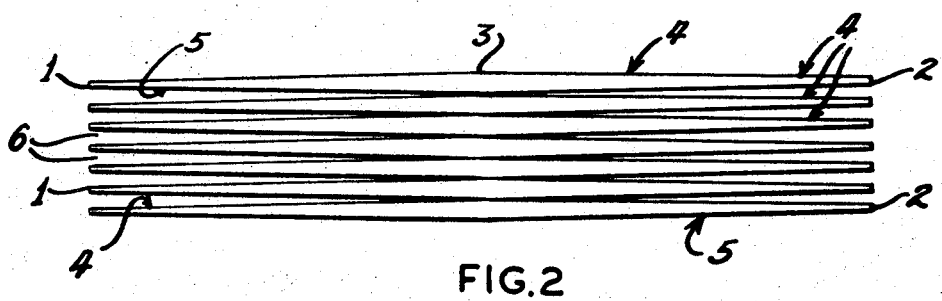
Figure 3:
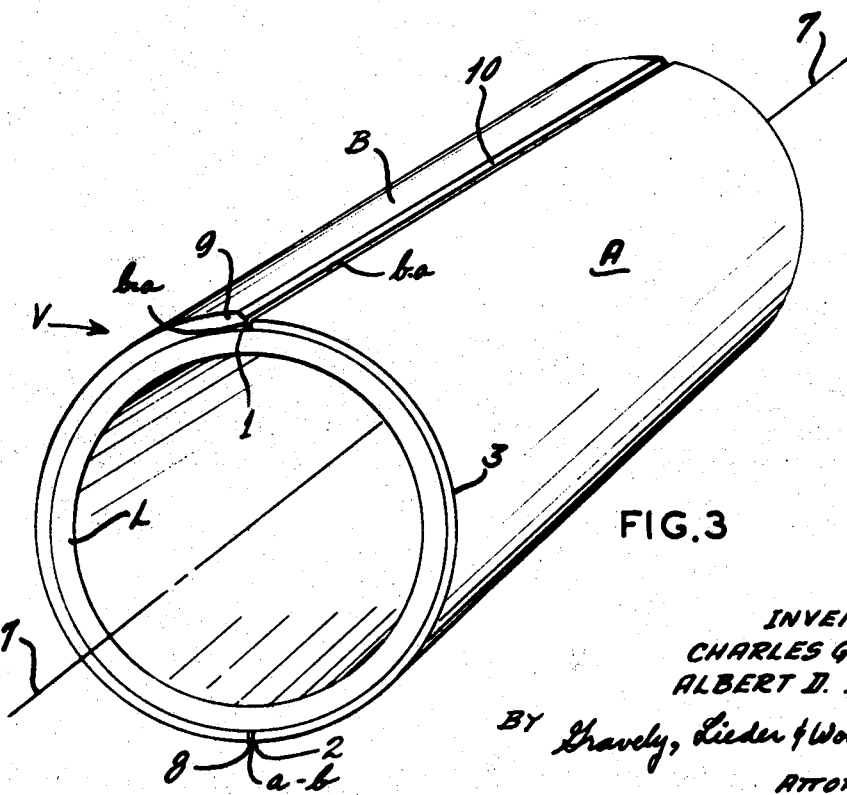
Figure 4:
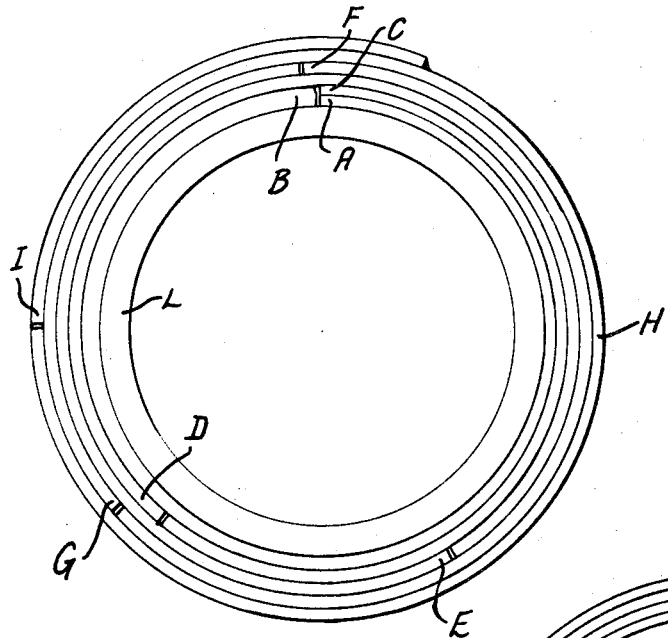

FIG. 2 is a diagrammatic view of the segments shown in FIG. 1 stacked one on top of the other with the edges and crowns in vertical alignment, the curvature being emphasized to illustrate the invention, FIG. 3 is a perspective view showing the liner with the first segment of constant thickness and the second segment of increasing thickness, FIG. 4 is a vertical cross-sectional view of a multi-layer vessel embodying the present invention using one truncated segment.

Figure 5:
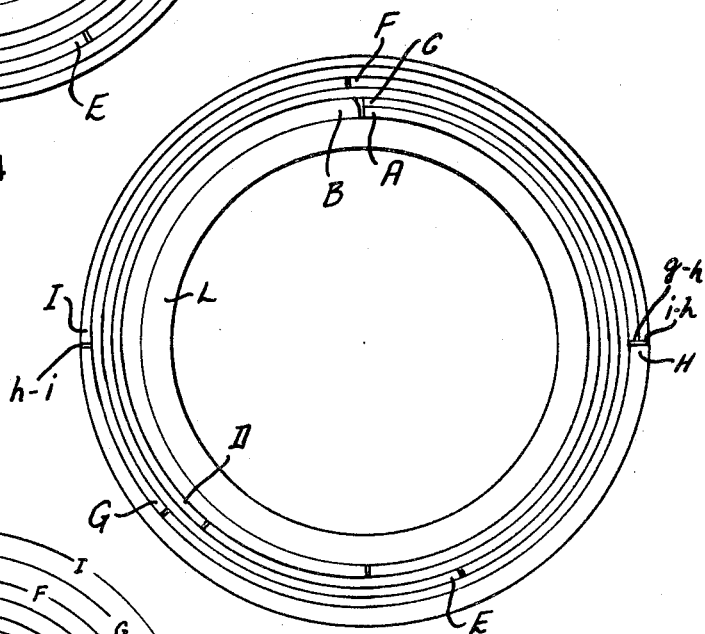
Figure 6:
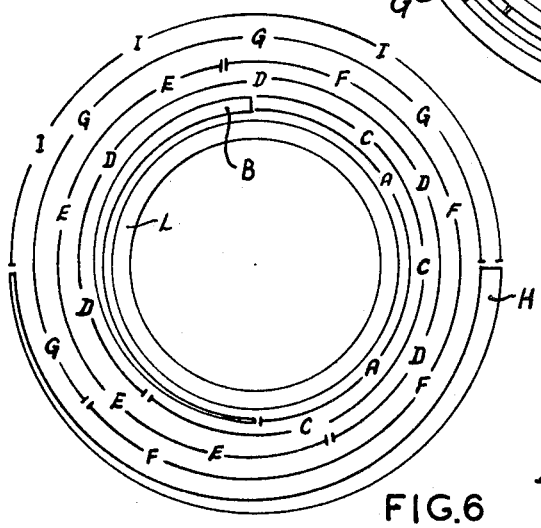

FIG. 5 is a vertical cross-sectional view of such a vessel using two truncated segments, and FIG. 6 is a diagrammatic cross-sectional view of the multi-layer vessel shown in FIG. 5.

Referring now to the drawings in detail, it will be seen that the embodiment of the invention which has been illustrated comprises a method for making the cylindrical surface of a multi-layer vessel V having a liner L and a plurality of segments S wrapped therearound. As used herein, this cylindrical portion will be referred to as the vessel, it being understood that suitable ends will have to be applied to the vessel V. The liner L is preferably a seamless tube. However, the liner L may be a rolled tube which has been welded longitudinally, with the weld ground off so that a smooth outer surface is presented. The invention will be described with a liner having a thickness of about .5″ and segments of .25″ thickness, although different thicknesses for the liner L and segments may be used if thicker or thinner wall thicknesses are desired and as the vessel diameters and purposes may require. Segments of .375″ and .5″ are frequently desired, especially for large diametered vessels made from moderate steels. In describing the invention, 0° is at top or at 12 o'clock as shown in the drawings, 90° is at the right or at 3 o'clock, 180° is at the bottom or at 6 o'clock, and 270° is to the left or at 9 o'clock. The vessel described will be wrapped in a clockwise direction, but it may be wrapped counterclockwise if desired.

As shown in FIG. 1, the flat segment A has an initial edge 1 and a final edge 2 which are parallel and which are the side edges of the strip as rolled in the steel mill. The crown 3 or thick portion is midway between the edges 1 and 2 and extends parallel thereto. The segment A has a top surface 4 and a bottom surface 5. As shown in FIG. 2, there would be spaces 6 between the edges of the segments if one were simply stacked on the other with their crowns 3 in vertical alignment. A typical so-called flat segment A may measure 8 feet wide by 16 feet parallel to the direction of roll. The direction of rolling in the steel mill is shown by the arrow R in FIG. 1. In such a typical flat segment referred to herein as having a thickness of .25″, the actual average thickness at the edges may be .255″ and the thickness at the crown or thickest portion may be greater and of the order of .272″, but of course, such dimensions will vary depending upon the steel mill supplier, the equipment used in the rolling operation in the steel mill, and the thickness of the segments attempted to be rolled. In a segment .25″ thick, the thickness may vary as much as .02″, but in segments having a desired average thickness of .5″, the thickness may vary as much as .05″. Steel segments .25″ thick with dimensions of 8 feet by 16 feet theoretically should weigh about 1,306 pounds, but because of the crown, may actually weigh about 1,420 pounds. In another typical segment A which was 10 feet wide by 16 feet long the edges were .255″ thick and the crown was .288″ thick, and while the theoretical weight was 1,632 pounds, its actual weight was 1,814 pounds. The foregoing details are mentioned so that the problems inherent in the manufacture of thick walled vessels from a plurality of segments or layers will be more readily understood.

As shown in FIG. 3, segment A is rolled in the vessel fabricator's shop and placed against the liner L from 0° to 180° so that its thickest portion or crown 3 is at 90° and extends parallel to the axis 7 of the vessel V.

Truncated segment B is then applied from 180° to 0° with its thin initial edge 8 of .25″ at 180° and its thick edge 9 of .5″ at 0°. The thickness of segment B gradually increases from the thickness of segment A to twice said thickness. The edges 8 and 9 are spaced slightly away from the edges 2 and 1 of the segment A to form gaps $b-a$ and $a-b$ therebetween. The gap $a-b$ is the gap between the final edge 2 of segment A and the initial edge 8 of segment B. Circumferential bands are then placed around the segments A and B to press them into firm contacting relation with the liner L, and tack welds are made at the gaps $a-b$ and $b-a$ at 0° and 180°. The bands are moved longitudinally a few inches, tightened, and more tack welds are made at said gaps. After each gap has been tack welded along its entire length at intervals, the bands are removed. A weld bead is deposited in the gap $a-b$ at 180° and ground off. The thick edge 9 of segment B terminates parallel to the initial starting edge 1 of segment A and is a constant distance therefrom to form the gap $b-a$ at 0° into which a weld bead is deposited to a height of segment A. The thick edge 9 of the segment B has a vertical portion about .25″ thick, and a sloping or bevelled surface 10 thereabove to permit the weld bead to be applied more easily in the gap $b-a$.

Segment C is of constant thickness of .25″. It is rolled and applied to the vessel V from 0° to about 220° by spacing its initial edge 1 adjacent to the bevelled edge 10 of segment B, placing circumferential bands therearound, tightening said bands to force segment C into tight contacting relation, tack welding along the gap $b-c$, moving said bands and tack welding periodically, removing said bands and depositing a weld bead in the gap $b-c$ between segments B and C. It is understood that the 0° to 220° wrap around of segment C is not critical since the purpose of this invention is to be able to use segments of any width (that is, from the initial edge 1 to the final edge 2) and which do not have to be cut accurately as in concentric circle multi-layer vessels. Therefore, segment C or any other segment of constant thickness may wrap around the vessel to any desired degree, preferably 180° or more, but it must wrap around less than 360°. If smaller pieces are all that are available, they may also be used in this invention even though they do not wrap around even 180°, but these have certain advantages in that they require more longitudinal welds, which welds tend to shrink and therefore cause greater tensioning in the vessel being formed.

Segments D, E, F, and G, and as many others as desired, are of constant thickness of .25″. These are applied in a manner similar to the application of segment C. Each of these segments may vary in the degree to which it wraps around the vessel V, but all preferably wrap around more than 180° and must wrap around less than 360°. Their positions may be:

| Segment | Position of Initial Edge | Position of Crown | Position of End Edge |
|---|---|---|---|
| D | 220° | 10° | 160° |
| E | 160° | 255° | 350° |
| F | 350° | 110° | 230° |
| G | 230° | 340° | 90° |

It is understood that in each of these segments of constant thickness, the crown will be positioned parallel to the longitudinal axis of the vessel V. Also, when the segments are rolled in the steel mill their outer longitudinal edges are parallel. These parallel edges form the initial and the end edge of each of the segments. With most typical vessels, sufficient segments are applied so that there will be 20 to 30 thicknesses of layer material in the vessel V. For most purposes, it will be satisfactory, certainly from a strength viewpoint and probably from an appearance viewpoint, to have the final edge of the last applied segment welded to the layer therebelow so as to form a step.

If a step is undesirable in any particular vessel, it can be eliminated by applying a second truncated segment H. For simplicity, segment H will be described as being applied after segment G, although it is understood that there may be five or ten or twenty or more segments between the second truncated segment H and the first truncated segment B. Truncated segment H is rolled and then applied from 90° to 270° with its thick initial edge of .5″ at 90° and its thin edge .25″ at 270°. The thick edge is spaced slightly away from the segment G to form a gap $g-h$ therebetween. Segment H preferably is the second last segment to be applied. The tapered segment H may be tack welded at various points to the segment therebelow, either along the exposed edges or in the central portions, as desired.

Segments I is of constant thickness of .25". It is rolled and applied to the vessel V from 271° to 89° so that its initial edge is spaced from the thin edge of segment H and its end edge is spaced from the upper half of the thick edge of segment H. Circumferential bands are then placed around segments H and I and tightened to press said segments H and I into firm contacting relation with the layer therebelow, and tack welds are made along the gaps h–i and i–h. After each of the two gaps has been tack welded at spaced or intervals along its longitudinal length, a weld bead is deposited into the gap to fill the same. The weld bead is then polished or ground off, if desired or necessary, so that there will be a smooth cylindrical surface presented at the gaps.

With the foregoing example, and using a .5" liner and segments A, C, D, E, F, G, and I which are .25" thick, and with segments B increasing from .25" to .5" and segment H decreasing from .5" to .25", it will be noted that the sum of the thicknesses of the liner and individual segments (i.e., the vessel wall thicknesse) will be substantially as follows at the following points around a circle.

*Table A*

| Degrees: | Inches |
| --- | --- |
| 0 | 2 |
| 45 | 2 |
| 90 | 2 |
| 135 | $1^{15}/_{16}$ |
| 180 | $1\frac{7}{8}$ |
| 225 | $1\frac{7}{8}$ |
| 270 | $1\frac{7}{8}$ |
| 315 | $1^{15}/_{16}$ |
| 360 or 0 | 2 |

The foregoing Table A of thicknesses is a theoretical arithmetic summation of perfectly flat material and does not take into account variations in thicknesses of the segments or any air spaces therebetween that are always present in actual use. The actual thickness in inches will vary, because as shown in FIG. 6, the crown 3 of each segment is staggered or removed from the crown of a different segment so that the actual thicknesses will vary slightly one way or the other from the figures mentioned in the foregoing Table A. The crowns of the segments are staggered to preserve roundness and to aid in the fit between segments, which in practice are curved or rolled on a rolling device in the vessel fabricator's shop before being applied to the liner or a preceding segment.

It will be noted that the foregoing vessel has its greatest wall thickness of 2" and its thinnest wall thickness of $1\frac{7}{8}$", but this slight difference in thickness is not objectionable for most commercial users of such multi-layer vessels. This slight difference is well within permissible limits, especially since most vessel have thicknesses of 4" or more, so that a $\frac{1}{8}$" difference becomes insignificant.

By using the foregoing method or process, one segment is applied after the other and no measuring of cutting is necessary since additional sheets can simply be rolled and welded on because the vessel will be spirally wound, and not concentrically wound after segment B has been applied. When the vessel approaches a desired thickness, a segment H which decreases from .5" to .25" may be applied to give the vessel a greater uniformity of wall thickness along any radial line. However, the last segments may all be flat segments and the vessel may have a longitudinal step 11 extending parallel to the axis 7 of the vessel V.

If desired, this invention permits the use of segments of varying length, as well as segments of varying widths from edges 1 to 2, so that the vessel V is built up gradually by a series of large patches. When the longitudinal length of the segment varies, transverse welds become necessary, but this may not be objectional in some kinds of multi-layer vessels.

In vessels V which have a liner L made from stainless steel or from any metal which is not weldable, a dummy liner of uniform thickness, say .25", may be applied completely around the liner L and the segments A and B secured to each other and to said dummy liner in the same manner as segments A and B would be applied to a liner made from material which can be welded. The use of a dummy liner or layer is well known in the industry for those vessels requiring a liner of special metal to which additional strengthening layers cannot be directly welded. As in the main method described, circumferential bands are placed around the segments A and B and the dummy liner, are drawn tight to force segments A and B into complete contacting relation with the dummy liner, and to force the dummy liner into contact with the liner L, and tack welds are positioned in the two gaps between segments A and B so as to join segments A and B to each other and to the dummy liner. The circumferential bands are then loosened, moved a few inches along the axis of the vessel, tightened, and additional tack welds made. The process is repeated until the gaps between segments A and B are tack welded throughout their length. A weld bead is then deposited in said gaps to a height equal to the thickness of segment A.

This invention is intended to cover all changes and modifications of the example of the invention herein chosen for purposes of the disclosure which do not constitute departures from the spirit and scope of the invention.

What is claimed is:

1. In a method of making multi-layer vessels having an inside liner, the steps of applying a plurality of segments having a substantially uniform thickness with a crown extending along the center portion thereof in parallel relation to the initial edge and final edge of each segment and a truncated segment having an initial edge with thickness substantially equal to the thickness of said other segments and increasing to a final edge having a thickness substantially twice the thickness of said other segments, applying said truncated segment as one of the first segments applied to said vessel so that truncated segment and at least one of said segments of uniform thickness extend completely around said liner outwardly thereof, the crown of said segment of uniform thickness extending parallel to the axis of the vessel, then applying said segments of substantially uniform thickness in spiral fashion to the multi-layer vessel being formed with their crowns parallel to the axis of the vessel to build up a plurality of segment thicknesses until the desired wall thickness of the vessel is attained.

2. The method set forth in claim 1 wherein said truncated segment and a segment of uniform thickness are applied in contacting relation with said liner and extend completely around said liner with weld beads therebetween.

3. The method set forth in claim 2 wherein said truncated segment extends about half way around said liner in contacting relation therewith.

4. The method set forth in claim 1 wherein each segment other than said truncated segment is of substantially uniform thickness and extends more than 180° and less than 360° around said vessel.

5. The method set forth in claim 4 wherein said crowns of said segments are off-set from one another.

6. The method set forth in claim 1 wherein said segments are attached to said vessel by encircling bands which are tightened, applying tack welds between the segment being applied and a segment which has already been been applied, moving said bands longitudinally and applying additional tack welds in spaced relation along the entire axial length of said segment, removing said bands, and applying a weld bead in the space between said segments having said tack welds therein.

7. The method set forth in claim 1 wherein a second truncated segment is one of the last segments which is applied, said second truncated segment having a thickness twice the thickness of a segment of uniform thickness at its initial edge and gradually reducing in thickness to one half of its initial edge thickness.

8. The method set forth in claim 7 wherein said second truncated segment extends about half way around the vessel and forms about half of the exposed outer wall of the vessel.

References Cited

UNITED STATES PATENTS

| | | | |
|---|---|---|---|
| 311,750 | 2/1885 | Hammill | 138—144 |
| 1,925,118 | 9/1933 | Stresau | 220—3 |
| 2,209,402 | 7/1940 | Kepler | 138—171 X |
| 2,268,961 | 1/1942 | Raymond et al. | 29—471.1 X |
| 2,799,524 | 7/1957 | Zagorski et al. | 138—144 |
| 3,092,148 | 6/1963 | Carstens | 138—143 X |
| 3,163,183 | 12/1964 | Sagara | 138—144 |

CHARLES T. MOON, *Primary Examiner.*

J. L. CLINE, *Assistant Examiner.*